United States Patent Office 2,960,514
Patented Nov. 15, 1960

2,960,514

MANUFACTURE OF CYCLOPENTADIENYL MANGANESE CARBONYL COMPOUNDS

Jerome E. Brown, Detroit, and Earl G. De Witt, Royal Oak, Mich., and Hymin Shapiro, Baton Rouge, La., assignors to Ethyl Corporation, New York, N.Y., a corporation of Delaware No Drawing. Filed July 24, 1957, Ser. No. 673,767

1 Claim. (Cl. 260—429)

This invention relates to the manufacture of cyclopentadienyl manganese compounds and more particularly to the manufacture of cyclopentadienyl manganese tricarbonyl compounds, particularly alkylcyclopentadienyl manganese tricarbonyls.

Cyclopentadienyl manganese tricarbonyl compounds have been found to be exceptionally effective antiknocks for use in fuel, for spark plug ignition internal combustion engines. These compounds not only have exceptional effectiveness as antiknocks but also many of these compounds, principally the liquid compounds, have auxiliary properties which make them practical and desirable for commercial use. These auxiliary properties include high solubility in fuels, such as gasoline, and thermo-stability either alone or in gasolines which makes these compounds entirely satisfactory for use under the widely varying conditions to which gasoline and other fuels are normally subjected. Possibly of even greater importance, these compounds do not tend to form any appreciable deposits on the engine piston, valves and spark plug surfaces and likewise are not abrasive to the engine parts as are characteristic of iron compounds.

It is accordingly an object of this invention to provide an improved process for the manufacture of cyclopentadienyl manganese tricarbonyl compounds. Another object is to provide a process which minimizes by-product formation. Still another object is to provide a process which has a high throughput per unit quantity of reactor space and which is adapted to employ simple and economic process equipment. Another object is to provide a process using moderate pressures and agitation. Other objects and advantages of the invention will be more apparent in the following description and appended claim.

It has now been found that cyclopentadienyl manganese tricarbonyl compounds can be produced in excellent yields by reacting bis(cyclopentadienyl) manganese compounds with carbon monoxide at a temperature above 180° C. to provide the desired product in yields usually well in excess of 80 percent of the desired cyclopentadienyl manganese tricarbonyl. It is found that the higher temperatures i.e. above 190° C. are particularly advantageous since by-product formation is substantially minimized and better liquid-gas contacting is accomplished. For this reason, lesser amounts of agitation and/or lesser carbon monoxide pressures are required to obtain exceedingly fast reaction rates. This is particularly surprising since the high temperatures would be expected to increase by-product formation and decomposition and thus reduce the ultimate yield to the desired product. Likewise, these higher temperatures would be expected to lower the rate of reaction due to lowering of solubility of the gaseous carbon monoxide in the reaction medium. Also the improved liquid-gas contacting significantly lowers the degree of agitation required in the process making the process much more desirable for commercial operation.

As an example of the outstanding effect of temperature on this reaction, when the reaction is conducted at 165° C., using agitation of 0.008 horsepower per gallon, 72 minutes are required to obtain a 90 percent ultimate yield of the desired cyclopentadienyl manganese tricarbonyl compound. Under identical conditions, except that the temperature is raised to 215° C., the same yield is obtained in only about 26 minutes or approximately one-third the time. Of course, the solubility of the carbon monoxide would be expected to be materially decreased at this elevated temperature and, therefore, a decrease in the reaction rate would actually be expected. In consequence, it is possible to reduce the agitation or to reduce the carbon monoxide pressure while still having a high reaction rate, thus permitting the use of materially lower cost equipment and essentially eliminating much of the risk involved in high pressure reactions. For example, in using only 300 p.s.i. of pressure, 90 percent yield is obtained in only 52 minutes at 215° C. compared with 72 minutes for 500 p.s.i. at 165° C. Increasing the agitation at the lower temperature of 165° C. does not have the same marked effect as temperature since, when using 0.06 horsepower per gallon in contrast to 0.008 the reaction time is decreased only to 48 minutes compared with 26 minutes at the higher temperature.

In carrying out the process of this invention, it is generally desirable to employ a solvent, preferably an ether, which has a boiling point above the operating temperature of the reaction, or at least, which exerts a vapor pressure which is less than about 50 percent of the carbon monoxide pressure.

The following are typical examples of the present invention and are given for the purpose of illustration and not a limitation. In these examples, all quantitative units are in parts by weight.

EXAMPLE I

To a reactor provided with a stirrer and heating means is added 9.5 parts of ethylene glycol dimethyl ether and 3.36 parts of sodium. The reactor is heated to 110° C. The sodium and solvent are thereafter agitated for a few minutes to liquify and disperse the sodium. Methylcyclopentadiene monomer is then fed to the reactor over a period of 1½ hours until a total of 13.64 parts are added. The monomer is obtained by heating liquid methylcyclopentadiene dimer to a temperature of about 190° C. and the product is thereafter fractionized to obtain a pure methylcyclopentadiene monomer. This reaction mixture is then heated for ½ hour at 110° C. The reaction product is thereafter transferred to a second reactor similar to that described above and 9.15 parts of manganous chloride are added having a purity of 97 percent. This reaction is then stirred at 125° C. for 1½ hours. The reaction product bis(methylcyclopentadienyl) manganese is thereafter transferred to a pressure vessel equipped with heating and cooling apparatus and, after the temperature of the system is raised to 215° C., carbon monoxide is added to give a total pressure of 500 p.s.i.g. The reaction mass was agitated using 0.008 horsepower per gallon. The reaction is essentially complete after about 26 minutes.

The reaction mass is subjected to distillation to remove the solvent and the cyclopentadienyl manganese tricarbonyl compound separately.

The manganese compound can be subjected to fractionation and the purified product thereafter blended with gasoline. The following Table I presents data showing the octane increase of a commercial gasoline having an initial boiling point of 94° F. and a final boiling point of 390° F. The antiknock value of the fuel as determined by the ratings are given in octane numbers for figures below 100 and in Army-Navy performance numbers for values above 100. The method of determining performance numbers is explained in the booklet "Aviation Fuels and Their Effect on Engine Performance," NAVAER-06-5-501, USAF T. O. No. 06-5-54, published in 1951.

Table I

| $C_5H_7Mn(CO)_3$ g. metal/gal: | Octane rating |
|---|---|
| 0 | 83.1 |
| 1.0 | 92.7 |
| 2.0 | 95.8 |
| 3.0 | 98.0 |
| 5.0 | 102.0 |

EXAMPLE II

Following the same procedure as Example I, but employing only 300 p.s.i. carbon monoxide pressure, the reaction was essentially complete after 52 minutes. The ultimate product yield, based on carbon monoxide uptake, was 97.5 percent.

EXAMPLE III

Example I was repeated except that the temperature of the carbonylation reaction was only 165° C. The reaction was essentially complete after about 72 minutes and gave an ultimate yield of about 92.8 percent.

EXAMPLE IV

Example I was repeated except that the temperature was only 165° C. and the agitation was increased to about 0.06 horsepower per gallon. In this case, 90 percent of the product was obtained after 48 minutes and the ultimate yield was 93.9 percent.

The following Table II illustrates other variations and conditions of the process of the present invention.

ride per mole of the sodium cyclopentadienyl compound to about 1.3 moles of manganous chloride per mole of the sodium cyclopentadienyl compound to give similar results.

EXAMPLE XV

Example I is repeated except that cyclohexylamine is employed as the solvent and the temperature is maintained at 134° C. In this example, 400 p.s.i.g. of carbon monoxide pressure is employed. Essentially quantitative yields of cyclopentadienyl manganese tricarbonyl are produced.

Many cyclopentadienyl manganese tricarbonyl compounds can be recovered in accordance with the present invention in addition to those given in the above examples. In general, cyclopentadienyl or substituted cyclopentadienyl compounds containing a total of from about 5-20 carbon atoms can be produced by this invention. The cyclopentadienyl radical can be alkyl substituted or can be of the indenyl or fluorenyl type, including the alkyl derivatives of the latter type compounds.

The preferred cyclopentadienyl manganese tricarbonyl compounds of this invention contain cyclopentadienyl radicals containing from 5 to 13 carbon atoms. These compounds have molecular weights up to about 315. Examples of these preferred cyclopentadienyl manganese tricarbonyl compounds includes methylcyclopentadienyl manganese tricarbonyl, cyclopentadienyl manganese tricarbonyl, indenyl manganese tricarbonyl, ethylcyclopentadienyl manganese tricarbonyl, n-octylcyclopentadienyl manganese tricarbonyl, phenylmethylcyclopentadienyl manganese tricarbonyl, and the like.

The above cyclopentadienyl manganese tricarbonyl compounds can be prepared from corresponding bis- Table II

| Example | Solvent | Cyclopentadienyl Alkali Metal | Temperature, ° C. | CO Pressure, p.s.i.g. | Agitation, HP/gal. | Product |
|---|---|---|---|---|---|---|
| V | diethylene glycol diethyl ether | cyclopentadienyl potassium. | 190 | 350 | 0.05 | cyclopentadienyl manganese tricarbonyl. |
| VI | diethylene glycol methyl phenyl ether. | butylcyclopentadienyl lithium. | 195 | 500 | 0.06 | butylcyclopentadienyl manganese tricarbonyl. |
| VII | propylene glycol dimethyl ether | ethylcyclopentadienyl sodium. | 180 | 600 | 0.01 | ethylcyclopentadienyl manganese tricarbonyl. |
| VIII | tetrahydrofuran | methylcyclopentadienyl sodium. | 185 | 375 | 0.09 | methylcyclopentadienyl manganese tricarbonyl. |
| IX | diethylene glycol dimethyl ether tetrahydrofuran (50-50). | methylcyclopentadienyl lithium. | 210 | 400 | 0.05 | Do. |
| X | dimethylene glycol dimethyl ether. | methylcyclopentadienyl sodium. | 225 | 300 | 0.005 | Do. |
| XI | tributylamine | indenyl sodium | 200 | 250 | 0.02 | indenyl manganese tricarbonyl. |
| XII | dibutyl acetal | fluorenyl sodium | 190 | 300 | 0.08 | fluorenyl manganese tricarbonyl. |
| XIII | xylene | methylcyclopentadienyl sodium. | 205 | 450 | 0.6 | methylcyclopentadienyl manganese tricarbonyl. |
| XIV | methylcyclopentadiene dimer | do | 190 | 400 | 0.5 | Do. |

Examples V–XIV were conducted similarly to Example I except that different solvents, cyclopentadiene compounds, temperatures, pressures and agitation are employed. The rate of reaction and yields in these examples are similar to those of Examples I–IV although they vary somewhat in each case depending upon the temperature, pressure, and agitation in the same manner as is illustrated by Examples I–IV inclusive. In general, best results are obtained in those examples above using a glycol ether type solvent or tetrahydrofuran. The quantities of solvents and reactants in the above examples can be varied to give similar results. For example, the quantity of solvent in the above examples can be reduced to as much as ½ or can be increased to essentially 6 times the quantity employed in Example I with similar results. However, in general, the lower concentrations of solvent (the more concentrated recipes) are preferred since faster carbonylation reaction rates are obtained than with the more dilute recipes. This appears to be in contradiction to the fact that the reactions are believed to be first order with respect to both reactants. The concentration of manganous chloride employed in the above examples can be varied from about 0.8 mole of manganous chlo- (cyclopentadienyl) alkali metal compounds. For example, cyclopentadienyl manganese tricarbonyl is prepared by the reaction of carbon monoxide with bis(cyclopentadienyl) manganese. Likewise, methylcyclopentadienyl manganese tricarbonyl is prepared by reacting carbon monoxide with bis(methylcyclopentadienyl) manganese. Thus, corresponding cyclopentadienyl manganese tricarbonyl compounds can be prepared from bis(ethylcyclopentadienyl) manganese, n-octylcyclopentadienyl manganese, bis-indenyl manganese, bis-fluorenyl and the like.

The temperature of the carbonylation reaction is generally maintained above about 170° C. and temperatures between about 190–250° C. are preferred. At lower temperatures, excessive agitation or undesirably high carbon monoxide pressures are normally required to obtain a desirably high reaction rate and also at lower temperatures somewhat lower ultimate yields are obtained. The low yields are apparently due to undesirable side reactions which form other undesired manganese carbonyl compounds. Temperatures can be used up to a point wherein the cyclopentadienyl manganese tricarbonyl compound tends to decompose at an unsatisfactory rate, although most of the advantages are obtained below about 250°

C. The specific optimum temperature depends somewhat on the product being produced and the solvent employed. Since these reactions are exothermic, there is a distinct advantage in carrying the reaction out at the more elevated temperatures since the problem of cooling is simplified and the cost of cooling equipment is minimized. Also, as pointed out previously, the higher temperatures permit the use of lower pressures and lower degrees of agitation which make possible the use of cheaper equipment.

The use of carbon monoxide gas is preferred although other forms of carbon monoxide can be used in some instances. The purity of the carbon monoxide is not critical although it is generally desirable to employ a gas which contains little or no impurities which tend to react with the cyclopentadienyl manganese compound or with the product or result in a high partial pressure of inert gases in the system. In some cases, it is found desirable to feed a mixture of carbon monoxide and hydrogen as it is formed in certain of the commercial manufacturing processes.

The carbon monoxide pressure can vary from about atmospheric pressure to 3000 p.s.i.g. or greater. However, by far the most desirable operation uses pressures ranging from about 100 p.s.i. to 800 p.s.i. Due to reactor design, it is normally preferred to operate at pressures below about 500 p.s.i.g. since the materials and methods of construction make the reactor much cheaper and the process less dangerous. A minimum carbon monoxide pressure of 200 p.s.i.g. is preferred.

The solvents that can be employed in the carbonylation are of widely varying type but preferably they should have a boiling point near or above the temperature of the reaction. In general, it is desired at least that the solvent partial pressure be less than about 50 percent of the carbon monoxide pressure under the conditions of the reaction. The most preferred solvents are the glycol dialkyl ether type and cyclic ethers although amines, hydrocarbons and others can be used. Best results are obtained with the glycol lower dialkyl ethers. Typical examples of solvents suitable for this invention are dibutyl ether, diethylene glycol dimethyl ether, diethylene glycol diethyl ether, diethylene glycol dibutyl ether, ethylene glycol methyl phenyl ether, propylene glycol dimethyl ether, propylene glycol diethyl ether, methyl morpholine, triethylamine, tributylamine, cyclohexylamine, benzamine, xylene and polymeric hydrocarbons such as dicyclopentadiene, dimethyl cyclopentadiene, and high molecular weight oils such as the mineral oils. In some cases, the higher glycol ethers are suitable such as tetraethylene glycol dimethyl ether, tetraethylene glycol dibutyl ether and the like.

The quantity of solvent to be employed in the carbonylation reaction can vary from about 2/10 part of solvent per part of bis(cyclopentadienyl) manganese compound to about 10 parts or more per part of bis(cyclopentadienyl) manganese compound. The more concentrated recipes are preferred since, contrary to expectations, it appears that the reaction rate is improved and at the same time much less solvent must be removed from the product during the purification operation. Normally quantities of from about 5/10 part to about 2 parts of solvent per part of cyclopentadienyl manganese compound are used.

Agitation of the carbonylation reaction is important to obtain a satisfactory reaction rate of the gaseous carbon monoxide and the bis(cyclopentadienyl) manganese compound. As pointed out above, however, the degree of agitation necessary for an adequate rate is greatly dependent upon the temperature of the reaction and somewhat upon the pressure of carbon monoxide used. It is usually preferred to use the higher temperatures so as to minimize the agitation required during reaction. Normally, agitation is employed ranging from about 0.001 to about 1 horsepower per gallon of reaction mixture, although preferably agitation of from about 0.005 to about 0.1 horsepower per gallon is employed. Below about 0.01 horsepower, very slow carbonylation rates are obtained. The type of agitation does not affect the reaction although the efficiency depends somewhat upon the type of mechanical agitator used. In general, higher horsepower per gallon input agitation is necessary with smaller reactor vessels.

The bis(cyclopentadienyl) manganese compounds used in the present process can be prepared by a number of known methods including the reaction of a manganese thiocyanate with a cyclopentadienyl alkali metal e.g. sodium in liquid ammonia. The preferred method of preparation involves the reaction of a manganese salt preferably a halide such as the chloride with the alkali metal cyclopentadienyl compound in an ether solvent. The general methods of preparation are described in "Chemistry and Industry" (March 13, 1954, page 307). The cyclopentadienyl alkali metal compound likewise can be prepared in a number of ways but a preferred process involves the reaction of finely divided alkali metal, e.g. sodium, with the cyclopentadiene hydrocarbon compound in a solvent system. For example, suitable methods are disclosed in British Patent No. 763,047 and United States Patent No. 2,777,887.

EXAMPLE XVI

A reaction vessel equipped with means for charging and discharging liquids and solids, gas inlet and outlet means, temperature measuring devices, heating and cooling means, means for agitation and means for condensing vapors, was purged with previously purified nitrogen. To the flask was then added 400 parts of tetrahydrofuran and 23 parts of sodium dispersed in 23 parts of mineral oil. An atmosphere of nitrogen was maintained in the reaction vessel throughout the run. The vessel was cooled to 10° C. and 80 parts of freshly distilled methylcyclopentadiene was added in small increments, with agitation while maintaining a temperature below 15° C. After the addition of the methylcyclopentadiene, the temperature was allowed to rise to 23° C. over a period of about 2 hours when the completion of the formation of the methylcyclopentadienyl sodium was evidenced by the cessation of hydrogen evolution. To this solution of methylcyclopentadienyl sodium and tetrahydrofuran was added 63 parts of anhydrous manganous chloride. The mixture was heated and maintained at reflux temperature for 20 hours. Carbon monoxide was thereafter reacted with this reaction product containing bis(methylcyclopentadienyl) manganese at substantially 170° C. and a total pressure of 400 to 500 p.s.i.g. over a period of about 5.75 hours, during which time the reaction mixture was vigorously agitated. The reaction mixture was then dispersed into about 800 parts of water and steam distilled, taking off the tetrahydrofuran first and the product next. The product was separated from the water layer and purified by distillation at reduced pressures. Based on the amount of $MnCl_2$ employed, 54.2 percent of methylcyclopentadienyl manganese tricarbonyl product was obtained. When using temperatures, e.g. above 190° C. and higher pressures of carbon monoxide of the order of 400–500 p.s.i.g. so as to minimize the effect of the partial vapor pressure of the tetrahydrofuran, yields of about 80 percent can be obtained.

EXAMPLE XVII

Phenylcyclopentadiene, obtained by treating cyclopentenone with phenyl lithium to give 1-phenyl, 2-cyclopentene-1-ol which upon distillation yields phenylcyclopentadiene. It is reacted with sodium according to the procedure described in Example XVI to give phenylcyclopentadienyl sodium. This is reacted with manganous bromide in diethylene glycol dimethyl ether to give bis-(phenylcyclopentadienyl) manganese and the reaction mixture contacted with carbon monoxide at a pressure of substantially 300 p.s.i. carbon monoxide pressure and a temperature of substantially 200° C. to give phenylcyclopentadienyl manganese tricarbonyl in good yield.

EXAMPLE XVIII

In the process of Example XVII 120 parts of 4,5,6,7-tetrahydroindene is reacted with 72 parts of manganese oxalate. The intermediate reaction mixture is reacted with carbon monoxide at a pressure of 20,000 p.s.i. and a temperature of 220° C. to give a good yield of 4,5,6,7-tetrahydroindenyl manganese tricarbonyl.

We claim:

The process for the manufacture of a cyclopentadienyl hydrocarbon manganese tricarbonyl comprising reacting carbon monoxide with a bis(cyclopentadienyl hydrocarbon) manganese in an ether solvent selected from the group consisting of ethylene glycol dialkyl ethers and diethylene glycol dialkyl ethers, said alkyl groups of said glycol ethers being selected from the group consisting of methyl and ethyl, at a temperature of between 190 and 250° C., and at a pressure of from 200 to 800 pounds per square inch, the reaction mass being agitated during the reaction using from about 0.005 to 0.10 horsepower per gallon of reaction mass.

References Cited in the file of this patent

UNITED STATES PATENTS 2,898,354     Shapiro et al. _____ Aug. 4, 1959

OTHER REFERENCES

Fischer et al. "Zeit Naturfarsch," vol. 9b, pages 618 (1954).

Birmingham et al.: "Naturwissenschaften," vol. 42, page 96 (1955).